(12) United States Patent
Mueller et al.

(10) Patent No.: US 10,427,504 B2
(45) Date of Patent: Oct. 1, 2019

(54) ELECTRICALLY SWITCHABLE MOTOR-VEHICLE GLAZING

(71) Applicant: KUSTER HOLDING GmbH, Ehringshausen (DE)

(72) Inventors: Stefan Mueller, Wetzlar (DE); Robert Marchant, West Midlands (GB); Andreas Schmidt, Solms (DE)

(73) Assignee: Küster Holding GmbH, Ehringshausen (DE)

( * ) Notice: Subject to any disclaimer, the term of this patent is extended or adjusted under 35 U.S.C. 154(b) by 24 days.

(21) Appl. No.: 15/129,025

(22) PCT Filed: Mar. 24, 2015

(86) PCT No.: PCT/EP2015/056210
§ 371 (c)(1),
(2) Date: Sep. 26, 2016

(87) PCT Pub. No.: WO2015/144678
PCT Pub. Date: Oct. 1, 2015

(65) Prior Publication Data
US 2018/0072139 A1    Mar. 15, 2018

(30) Foreign Application Priority Data

Mar. 28, 2014 (DE) .................. 10 2014 104 418

(51) Int. Cl.
*B60J 3/04* (2006.01)
*E05F 15/665* (2015.01)
(Continued)

(52) U.S. Cl.
CPC . *B60J 3/04* (2013.01); *B60J 1/16* (2013.01); *B60J 1/1846* (2013.01);
(Continued)

(58) Field of Classification Search
CPC ........................................ B60J 3/04
(Continued)

(56) References Cited

U.S. PATENT DOCUMENTS 4,815,984 A * 3/1989 Sugiyama ........... B60R 16/0239
174/72 A
4,939,867 A * 7/1990 Harada ................. E05F 15/689
49/349

(Continued)

FOREIGN PATENT DOCUMENTS

DE        4019787 A1    1/1991
DE        19832561 A1 * 1/1999 ............. H02K 5/225
(Continued)

OTHER PUBLICATIONS

Int'l Search Report dated Jun. 9, 2015 in Int'l Application No. PCT/EP2015/056210.

*Primary Examiner* — Marcus Menezes
(74) *Attorney, Agent, or Firm* — Rogowski Law LLC

(57) ABSTRACT

The invention relates to electrically switchable motor vehicle glazing, such as a side or rear window pane of a motor vehicle, wherein at least one optical property can be changed by feeding an electrical signal through a line arranged on a window-pane holder of the motor-vehicle glazing, wherein an open-loop or closed-loop control unit for feeding the electrical signal is provided in a housing, which is arranged in a stationary manner in relation to a motor-vehicle body.

4 Claims, 6 Drawing Sheets

(51) Int. Cl.
  *E05F 15/689* (2015.01)
  *H05B 3/84* (2006.01)
  *E05F 15/60* (2015.01)
  *B60J 1/16* (2006.01)
  *B60J 1/18* (2006.01)
  *E05D 15/16* (2006.01)
  *H02G 11/02* (2006.01)
  *H02G 11/00* (2006.01)
  *E05F 15/697* (2015.01)
  *B60R 16/02* (2006.01)

(52) U.S. Cl.
  CPC ............ *E05D 15/165* (2013.01); *E05F 15/60* (2015.01); *E05F 15/665* (2015.01); *E05F 15/689* (2015.01); *H02G 11/02* (2013.01); *H05B 3/84* (2013.01); *B60R 16/0207* (2013.01); *E05F 15/697* (2015.01); *E05Y 2400/654* (2013.01); *E05Y 2800/104* (2013.01); *E05Y 2800/344* (2013.01); *E05Y 2900/00* (2013.01); *E05Y 2900/55* (2013.01); *H02G 11/00* (2013.01)

(58) Field of Classification Search
  USPC .................................................. 49/349, 352
  See application file for complete search history.

(56) References Cited

U.S. PATENT DOCUMENTS

| | | | | |
|---|---|---|---|---|
| 7,500,331 | B2 * | 3/2009 | Hiramatsu | ............ E05F 15/689 49/358 |
| 8,381,848 | B2 * | 2/2013 | Asbach | .................... B62K 9/00 180/65.1 |
| 9,399,387 | B2 | 7/2016 | Kuhnen | |
| 2004/0221509 | A1 * | 11/2004 | Shibata | ................. E05F 11/445 49/350 |
| 2007/0262663 | A1 * | 11/2007 | Cheramy | ............... H02K 11/00 310/68 R |
| 2013/0050797 | A1 | 2/2013 | Takahashi | |
| 2014/0375083 | A1 * | 12/2014 | Tejeda | .................... B60J 7/043 296/187.11 |
| 2017/0089115 | A1 * | 3/2017 | Wang | .................... E05F 15/603 |
| 2018/0090876 | A1 * | 3/2018 | Klein | .................... E05F 11/385 |

FOREIGN PATENT DOCUMENTS

| | | | | |
|---|---|---|---|---|
| DE | 10328929 | A1 | 1/2005 | |
| DE | 102005038050 | A1 | 2/2007 | |
| DE | 102009037674 | A1 | 2/2011 | |
| DE | 102010056203 | A1 | 2/2012 | |
| DE | 102011056227 | A1 | 6/2013 | |
| DE | 102012013561 | A1 | 9/2014 | |
| DE | 102013003532 | A1 | 9/2014 | |
| DE | 102013003533 | A1 | 9/2014 | |
| DE | 102013104602 | A1 * | 11/2014 | ............ E05F 11/488 |
| EP | 489940 | A1 * | 7/1998 | ............... H05K 7/04 |
| EP | 1648076 | A1 * | 4/2006 | ............... H02K 15/14 |
| EP | 818872 | A1 * | 9/2006 | ............... H02K 11/04 |
| EP | 1703620 | A2 * | 9/2006 | ............... H02K 5/148 |
| EP | 2567842 | A1 | 3/2013 | |
| EP | 2801689 | A1 | 5/2014 | |
| WO | 03026104 | A2 | 3/2003 | |
| WO | 2015144678 | A1 | 10/2015 | |

* cited by examiner

ELECTRICALLY SWITCHABLE MOTOR-VEHICLE GLAZING

CROSS-REFERENCE TO RELATED APPLICATIONS

This application is a national stage application (under 35 USC § 371) of PCT/EP2015/056210, filed Mar. 24, 2015, which claims benefit of German application No. 10 2014 104 418.5, filed Mar. 28, 2014, the contents of each of which are incorporated by reference herein.

BACKGROUND OF THE INVENTION

Technical Field and State of the Art

The present invention relates to electrically switchable motor vehicle glazing, for instance, a side window or rear window of a motor vehicle, and it also relates to electrically switchable motor vehicle glazing that is arranged on a catch or on a drive housing or cable drum housing of the vehicle window regulator that serves for opening and closing the vehicle glazing, for example, a side window of a motor vehicle, in which at least one optical property can be changed by feeding an electrical signal via a line that is arranged on a window pane holder of the vehicle glazing.

Electrically switchable glazing of the above-mentioned type changes its optical property, for instance, its light transmittance, through the application of an electric voltage or electric power. Depending on the design, such glazing can serve, for example, as sun protection or can assume the function of view protection. Electrically switchable glazing can be configured as electrochromic glass or as liquid crystal (LC) glass, polymer dispersed liquid crystal (PDLC) glass or suspended particle device (SPD) glass.

Such electrically switchable glazing is employed, for example, in glazing for buildings for purposes of temperature control or as UV protection, but also in motor vehicles as sun protection in moon roofs, for instance, in panorama roofs. In order to control or regulate the optical properties of such electrically switchable glazing, there is a need for a separate electronic control or regulation unit. However, it is likewise a known approach for one of the control mechanisms present in the vehicle such as, for instance, a door control mechanism, to take over the task of controlling or regulating electrically switchable glazing, as a result of which there is no need for a separate control or regulation unit.

German patent application DE 103 28 929 A1 discloses a device having an electronic, sensor-controlled pinch-protection system that acts on window regulator mechanisms in motor vehicles. The device has a drive motor that moves a window regulator mechanism in response to control signals from control electronics. The window regulator mechanism has a sensor electrode that is arranged in the vicinity of the closing and opening edge of a window pane, and it also has evaluation electronics. The evaluation electronics and/or the control electronics are positioned in or on the catch.

Furthermore, international patent application WO 2003/026104 A2 discloses a drive unit for adjustment devices in motor vehicles, for example, window regulator devices, comprising an electric motor, a power supply unit that supplies the electric motor, at least one gear connected to the electric motor, and an electronic system. The electronics and the power supply unit are integrated into the housing of the electric motor and they carry out control and regulation functions of the electric motor as well as control, regulation and monitoring functions of the adjustment devices.

German patent application DE 10 2013 003 533 A1 describes a device for electrically contacting an electrically actuatable functional layer of a vehicle window pane that can be adjusted by a window pane catch. The window pane catch has at least two first contact elements for transmitting control signals to the functional layer, and these contact elements bring the functional layer into contact with the device in order to change the transparency of the functional layer by applying an electric field. The window pane catch is Y-shaped and it grips the window pane from two opposite sides, whereby a first Y-arm is rigid while a second Y-arm is movably connected to the housing by a hinge. Control electronics are arranged in a housing of the window pane catch.

German patent application DE 10 2010 056 203 A1 describes a device for adjusting the degree of transmittance of glass surfaces by applying an operating voltage. The device has at least one transmission line and at least one transformer with an integrated central unit for converting a source voltage. The central unit is integrated into the transformer in order to control the voltage and/or the frequency of an alternating voltage. The transformer and the central unit are arranged in a metal housing.

U.S. Pat. Appln. No. 2013/0050797 A1 and European patent application EP 2 567 842 A1 describe a device to control an electrically actuatable functional layer of vehicle window panes. The degree of transmittance of the functional layer is adjusted by applying an electric voltage to the functional layer. An inverter inverts a direct voltage from the vehicle battery into an alternating voltage in order to actuate the functional layer. This inverter is arranged on the lower portion of the glass pane in order to lower the center of gravity of the window pane and thus to ensure that the glass pane can be moved up and down smoothly. A mechanism to move the glass pane up and down is provided on the inverter.

German patent application DE 10 2009 037 674 A1 discloses a window regulator module for a motor vehicle comprising an adjustable window pane and at least one cable coupled to the adjustable window pane. When the window pane is adjusted, the cable is moved in such a way that the course of the cable changes. A vehicle element that cannot move along with the window pane is connected to the cable at a cable connection point. Moreover, the window regulator module has at least one flexible guide element between the window pane and the cable connection point of the vehicle element to which the cable, which is coupled to the window pane, preferably the cable of a power source and/or of regulation electronics, is connected to the unmovable vehicle element. The flexible guide element on which the cable runs prescribes at least portions of the course of the cable when the window pane is being adjusted. The guide element is coupled to the window pane by means of the connection of the guide element to a catch that is connected to the window pane.

Before this backdrop, the objective of the invention is to arrange a control or regulation unit for electrically switchable motor vehicle glazing in the vicinity of the vehicle glazing in order to minimize the fault-susceptibility of the signals that are used to control or regulate the optical properties of the vehicle glazing.

SUMMARY OF THE INVENTION

When it comes to electrically switchable motor vehicle glazing, for example, a side window or rear window of a motor vehicle in which at least one optical property can be changed by feeding an electric signal via a line arranged on a window pane holder of the vehicle glazing, a control or regulation unit for feeding the electric signal is provided in a housing that is stationary relative to the car body. The line for feeding the electric signal, for example, via a plug, is arranged on the control or regulation unit, which is located in the housing. The electric signal can be an electric voltage, an electric current, electric power or else an analog or digital signal such as, for example, a data signal. Preferably, the housing and thus also the control or regulation unit are arranged in the area or vicinity of the electrically switchable motor vehicle glazing. The length of the line is thus likewise minimized, thereby, in an advantageous manner, minimizing the fault-susceptibility of the signals on the line, for example, electric voltages, that are used to control or regulate the optical properties of the vehicle glazing.

In an advantageous embodiment of the invention, the housing is arranged on the sheet metal of the car body, on fixed vehicle glazing and/or on the drive housing or cable drum housing of a vehicle window regulator that serves for opening and closing the vehicle glazing. The housing can be arranged flexibly, depending on the vehicle or vehicle model. Here, it can be arranged either on the car body or else on fixed vehicle glazing such as, for example, a rear window of a motor vehicle.

In an advantageous manner, at least one fastening tab, at least one holder and/or at least one fastening extension is arranged on the outer wall of the housing. As a result, there are various ways to fasten the housing to the control or regulation unit that is arranged therein. By means of the fastening devices that are attached to the outer wall of the housing, the housing can be fastened in a simple manner to various parts of the vehicle such as, for instance, to the car body and/or to the fixed vehicle glazing.

According to an advantageous embodiment, the at least one fastening tab has a U-shaped cutout, for example, a slot, to be inserted into at least one projection arranged on the car body and/or on the drive housing or cable drum housing of a vehicle window regulator, or else it has a through hole to receive a fastening screw or the like. As a result, the housing can be, for instance, screwed, riveted or clipped onto the car body in a simple manner. An easy-to-install fastening option for the housing is achieved by a U-shaped cutout on the fastening tab(s). In this way, the housing can then be easily fastened by means of insertion, for example, to one or more projection(s) arranged on the car body it and can be released again in case of a defect in the control or regulation unit arranged in the housing.

According to another advantageous embodiment, the at least one holder is hook-shaped, preferably U-shaped or L-shaped, so that the vehicle glazing can be inserted into the free space enclosed by the holder. The vehicle glazing is held with a positive fit by means of the at least one holder having a hook-shaped configuration. Here, the electrically switchable motor vehicle glazing is preferably glued into the free space enclosed by the hook-shaped holder, so that the housing is held onto the window pane. In addition, the housing can be fastened to the car body by means of one or more fastening tabs so that the housing forms an additional holder for the vehicle glazing. However, it is also conceivable for the hook-shaped holder to have a spring force, so that the vehicle glazing is held with a positive and non-positive fit in the free space enclosed by the hook-shaped holder.

According to an advantageous embodiment of the invention, the at least one fastening extension is shaped in one piece onto the housing and it engages into at least one receptacle that has an appropriate inner contour matching the fastening extension and that is shaped in one piece onto the drive housing or cable drum housing. For this purpose, the fastening extension that is shaped in one piece onto the housing can have different shapes, for example, cylindrical, rectangular, elliptical or the like. Since the cross section of the at least one fastening extension that is shaped in one piece onto the housing has an angular or elongated shape, the housing is arranged so as to be non-rotatable relative to the drive housing or cable drum housing. The arrangement of two or more fastening extensions that are shaped in one piece onto the housing would likewise prevent a rotation of the housing relative to the drive housing or cable drum housing.

In an advantageous manner, the at least one fastening extension is pressed, glued, clipped or welded onto the at least one receptacle. A practical, inexpensive and also easy-to-install fastening variant is to clip the housing in place together with the drive housing or cable drum housing. In this manner, it is easy to replace the housing together with the control or regulation unit when they are in the assembled state. The assembly or the replacement of the housing together with the control or regulation unit can thus be done manually, without having to use a tool or other auxiliary means.

According to another advantageous embodiment of the invention, the housing is shaped in one piece onto the drive housing or cable drum housing of the vehicle window regulator in order to accommodate the control or regulation unit. Consequently, there is no need for any additional fastening devices on the housing such as, for example, fastening tabs or a fastening extension or the like.

According to another independent idea of the invention, electrically switchable motor vehicle glazing that is arranged on a catch of a vehicle window regulator that serves for opening and closing the vehicle glazing, for example, a side window of a motor vehicle has a control or regulation unit for feeding the electric signal in a housing that is arranged on the catch, whereby at least one optical property can be changed by feeding an electrical signal via a line arranged on a window pane holder of the vehicle glazing. The line for feeding the electric signal, for example, via a plug, is arranged on the control or regulation unit, which is located in the housing. The electric signal can be an electric voltage, an electric current, electric power or else an analog or digital signal such as, for example, a data signal. Since the housing and thus also the control or regulation unit are arranged on the catch of the vehicle window regulator, the length of the line leading to the window pane catch, which is preferably likewise arranged on the catch, is reduced considerably. In an advantageous manner, this minimizes the fault-susceptibility of the signals on the line, for example, electric voltages that are used to control or regulate the optical properties of the vehicle glazing. According to the invention, the housing is shaped in one piece onto the catch of the vehicle window regulator in order accommodate the control or regulation unit. As a result, there is no need for additional fastening devices such as, for instance, a fastening extension or the like.

According to an advantageous embodiment, at least one fastening extension is arranged on the outer wall of the housing. The housing, together with the control or regulation unit arranged therein, can thus be very easily fastened to the catch of the vehicle window regulator.

According to an advantageous embodiment of the invention, the at least one fastening extension is shaped in one piece onto the housing and it engages into at least one receptacle that has an appropriate inner contour matching the fastening extension and that is shaped in one piece onto the catch. For this purpose, the fastening extension that is shaped in one piece onto the housing can have different shapes, for example, cylindrical, rectangular, elliptical or the like. Since the cross section of the at least one fastening extension that is shaped in one piece onto the housing has an angular or elongated shape, the housing is arranged so as to be non-rotatable relative to the catch. The arrangement of two or more fastening extensions that are shaped in one piece onto the housing would likewise prevent a rotation of the housing relative to the catch.

According to an advantageous embodiment, the at least one fastening extension is pressed, glued, clipped or welded onto the at least one receptacle. A practical, inexpensive and also easy-to-install fastening variant is to clip the housing in place together with the catch. In this manner, it is easy to replace the housing together with the control or regulation unit when they are in the assembled state. The assembly or the replacement of the housing together with the control or regulation unit can thus be done manually, without having to use a tool or other auxiliary means.

According to another independent idea of the invention, electrically switchable motor vehicle glazing that is arranged on a drive housing or cable drum housing of a vehicle window regulator that serves for opening and closing the vehicle glazing, for example, a side window of a motor vehicle has a control or regulation unit for feeding the electric signal in a housing that is arranged on the drive housing or cable drum housing, whereby at least one optical property can be changed by feeding an electrical signal via a line arranged on a window pane holder of the vehicle glazing. The line for feeding the electric signal, for example, via a plug, is arranged on the control or regulation unit, which is located in the housing. The electric signal can be an electric voltage, an electric current, electric power or else an analog or digital signal such as, for example, a data signal. Since the housing and thus also the control or regulation unit are arranged on the drive housing or cable drum housing of the vehicle window regulator, the length of the line leading to the window pane catch is reduced considerably. In an advantageous manner, this minimizes the fault-susceptibility of the signals on the line, for example, electric voltages that are used to control or regulate the optical properties of the vehicle glazing.

According to an advantageous embodiment of the invention, at least one fastening extension is arranged on the outer wall of the housing, it is shaped in one piece onto the housing, and it engages into at least one receptacle that has an appropriate inner contour matching the fastening extension and that is shaped in one piece onto the drive housing or cable drum housing. For this purpose, the fastening extension that is shaped in one piece onto the housing can have different shapes, for example, cylindrical, rectangular, elliptical or the like. Since the cross section of the at least one fastening extension that is shaped in one piece onto the housing has an angular or elongated shape, the housing is arranged so as to be non-rotatable relative to the drive housing or cable drum housing. The arrangement of two or more fastening extensions that are shaped in one piece onto the housing would likewise prevent a rotation of the housing relative to the drive housing or cable drum housing.

According to an advantageous embodiment, the at least one fastening extension is pressed, glued, clipped or welded onto the at least one receptacle. A practical, inexpensive and also easy-to-install fastening variant is to clip the housing in place together with the drive housing or cable drum housing. In this manner, it is easy to replace the housing together with the control or regulation unit when they are in the assembled state. The assembly or the replacement of the housing together with the control or regulation unit can thus be done manually, without having to use a tool or other auxiliary means.

According to another advantageous embodiment of the invention, the housing is shaped in one piece onto the drive housing or cable drum housing of the vehicle window regulator in order to accommodate the control or regulation unit. Consequently, there is no need for any additional fastening devices such as, for example, fastening tabs or a fastening extension or the like.

In an advantageous manner, the interior of the housing has at least one guide for inserting and holding the control or regulation unit. In this way, the control or regulation unit can be easily and quickly inserted into the housing, thereby offering a secure hold. Furthermore, the control or regulation unit can be very easily replaced in case of a defect.

In an advantageous manner, the housing is sealed in the vicinity of its opening in order to protect the control or regulation unit that is arranged in the housing, and/or the control or regulation unit is cast into the housing. This prevents, for instance, penetrating moisture that could damage the control or regulation unit. In particular, this is necessary in the area of a vehicle door since this is a moist area of the vehicle, that is to say, moisture can penetrate here.

In an advantageous manner, the electrically switchable motor vehicle glazing can be heated by feeding an electric signal, preferably electric power, via the line that is arranged on the window pane holder of the vehicle glazing. Particularly the front and rear windows of a motor vehicle can be heated nowadays so as to quickly and easily rid them of ice.

DESCRIPTION OF THE DRAWINGS

The invention is explained on the basis of a number of embodiments. The following is shown.

DETAILED DESCRIPTION

Figure 1:
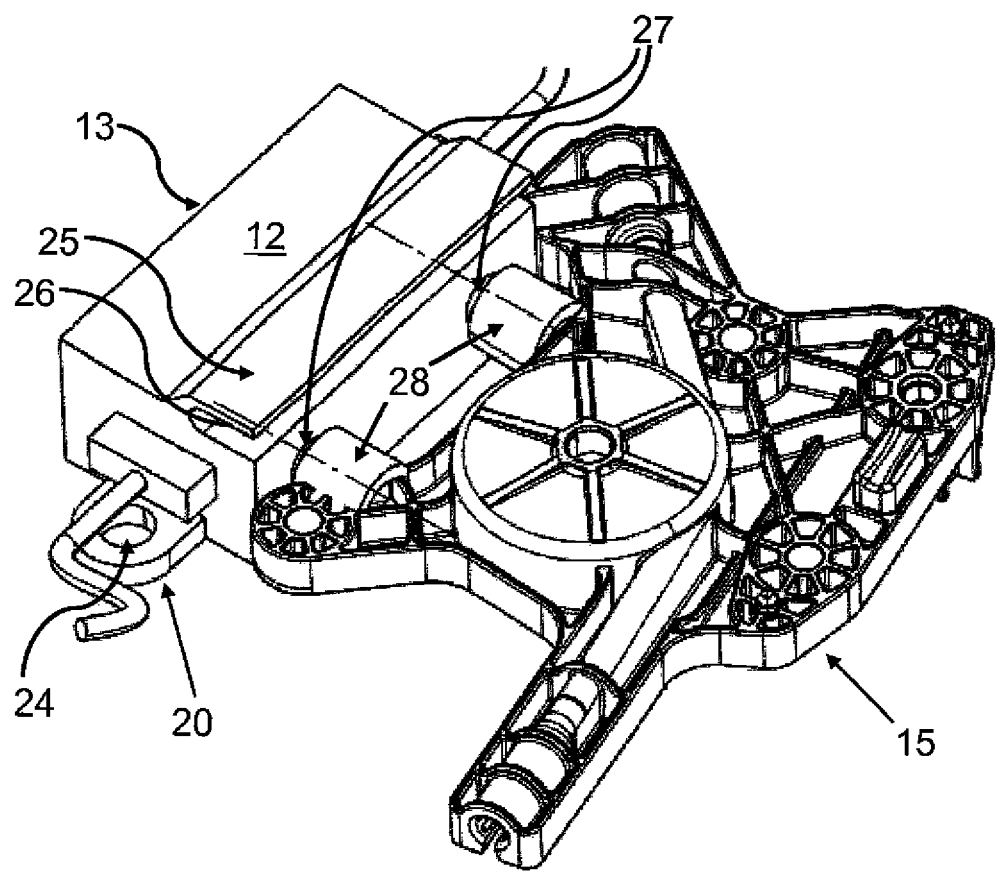
FIG. 1 a perspective view of a housing arrangement on a drive housing or cable drum housing of a vehicle window regulator, FIG. 2 a perspective view of a housing that is fastened to the car body, FIG. 3 a perspective view of a housing that is slipped onto the vehicle glazing, FIG. 4 a perspective view of a housing shaped in one piece onto a drive housing or cable drum housing, FIG. 5 another perspective view of the housing arrangement according to FIG. 4, and FIG. 6 a window regulator with a housing shaped in one piece onto a drive housing or cable drum housing.

The vehicle glazing shown in the figures serves to further illustrate the basic principle, whereby identical or functionally equivalent elements are at least provided with the same reference numerals.

FIG. 1 shows a drive housing or cable drum housing 15 of a vehicle window regulator with a housing 12 arranged on it in order to accommodate the control or regulation unit 11 for electrically switchable motor vehicle glazing 1, not shown in this figure. The control or regulation unit 11 is likewise not shown in this figure. The outer wall of the housing 12 has a lateral fastening tab 20 which, in turn, has a through hole 24 to receive a fastening screw or the like. Such a fastening tab 20 can likewise be arranged on the other side of the housing 12.

Furthermore, at the top of the housing 12, there is a hook-shaped holder 25 that is shaped onto the housing 12. Here, the hook-shaped holder 25 has an L-shaped leg 26. On the side opposite from the housing opening 13, two fastening extensions 27 are shaped in one piece onto the housing 12. As shown in FIG. 1, the fastening extensions 27 are cylindrical and engage into two hollow cylindrical receptacles 28 of the drive housing or cable drum housing 15. The fastening extensions 27 can be pressed, glued, clipped or welded onto the hollow cylindrical receptacles 28.

Figure 2:
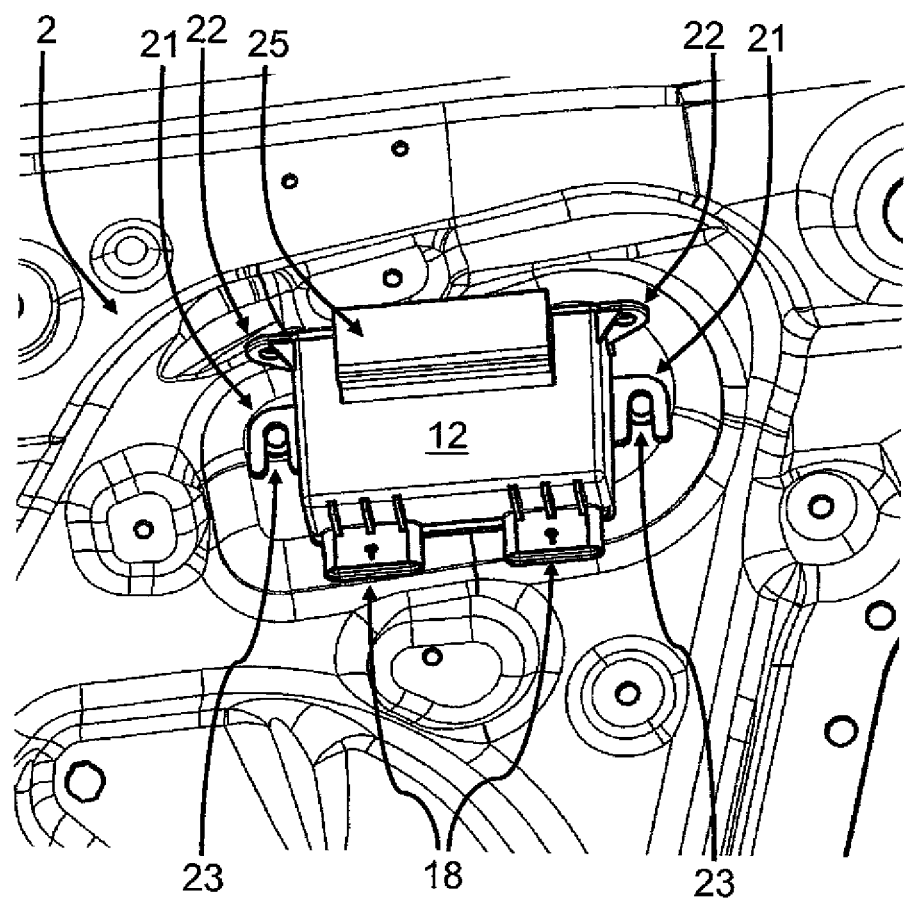

In FIG. 2, the housing 12 is fastened to the car body 2 by means of two lateral fastening tabs 21. For this purpose, the fastening tabs 21 have a U-shaped cutout 23 that engages into a projection of the car body 2 and thus allow a simple option for fastening the housing 12 to the car body 2. Accordingly, the housing 12 is not screwed on but rather is inserted into two projections of the car body 2, thus securing it with a positive and non-positive fit. Moreover, the housing 12 has two more upright fastening tabs 22 that are perpendicular to the fastening tabs 21, as a result of which additional variants are possible for fastening the housing 12 to the car body 2. Furthermore, the upper area of the housing 12 has a hook-shaped holder 25 into which fixed vehicle glazing 1, for example, a front or rear window of a motor vehicle can be inserted or glued. In the lower area of the housing 12, two plug or socket housings 18 whose cross sections are elongated and which are arranged next to each other are shaped in one piece onto the housing and they serve to accommodate, for example, plug contacts of the control or regulation unit 11.

Figure 3:
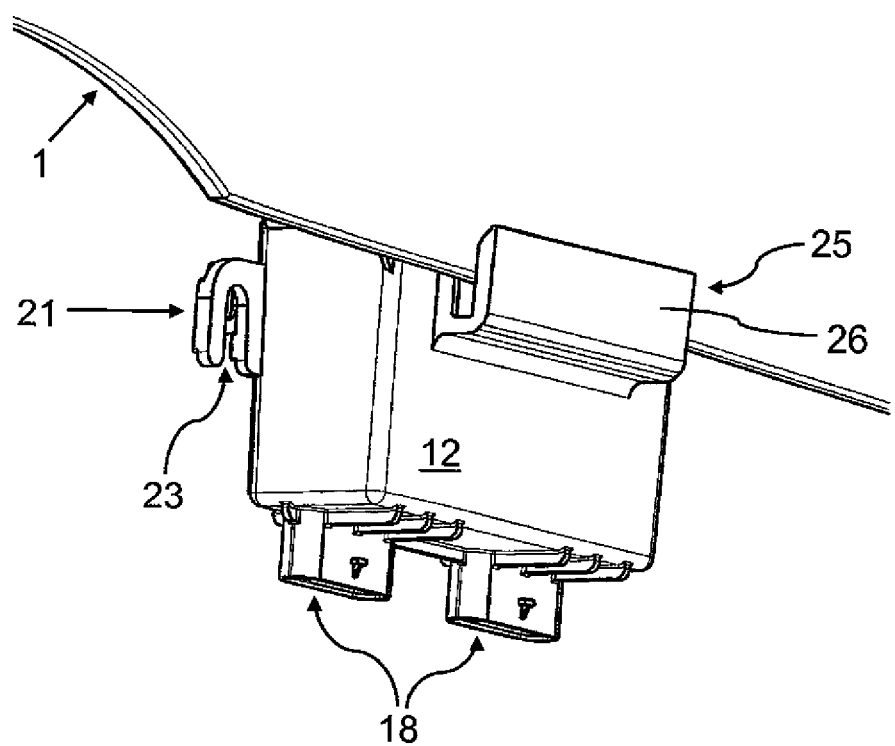

FIG. 3 shows vehicle glazing 1 that is inserted into the free space of the housing 12 surrounded by the hook-shaped holder 25. The vehicle glazing 1 can be configured so as to be fixed, for example, a front or rear window of a motor vehicle. For this purpose, the hook-shaped holder 25 has an L-shaped leg 26 that surrounds the vehicle glazing 1 at its lower end. The vehicle glazing 1 is held with a positive fit by the hook-shaped holder 25 or by the L-shaped leg 26. It is also conceivable that the vehicle glazing 1 is merely inserted or glued into the free space enclosed by the holder 25. The L-shaped leg 26 can also have a spring force so that the vehicle glazing 1 is held on the housing 12 with a positive and non-positive fit. In the lower portion of the housing 12, two plug and socket housings 18 whose cross sections are elongated and which are arranged next to each other are shaped in one piece onto the housing 12, and they serve to accommodate, for example, plug contacts of the control or regulation unit 11.

Moreover, the side outer wall of the housing 12 has a fastening tab 21 with a U-shaped cutout 23. Such a fastening tab 21 can likewise be arranged on the other side of the housing 12. The housing 12 can be fastened, for example, to the car body by means of the lateral fastening tabs 21. Here, the housing 12 can be inserted into a projection arranged on the car body 2. However, it is also conceivable to screw or rivet the housing 12 onto the car body 2.

Figure 4:
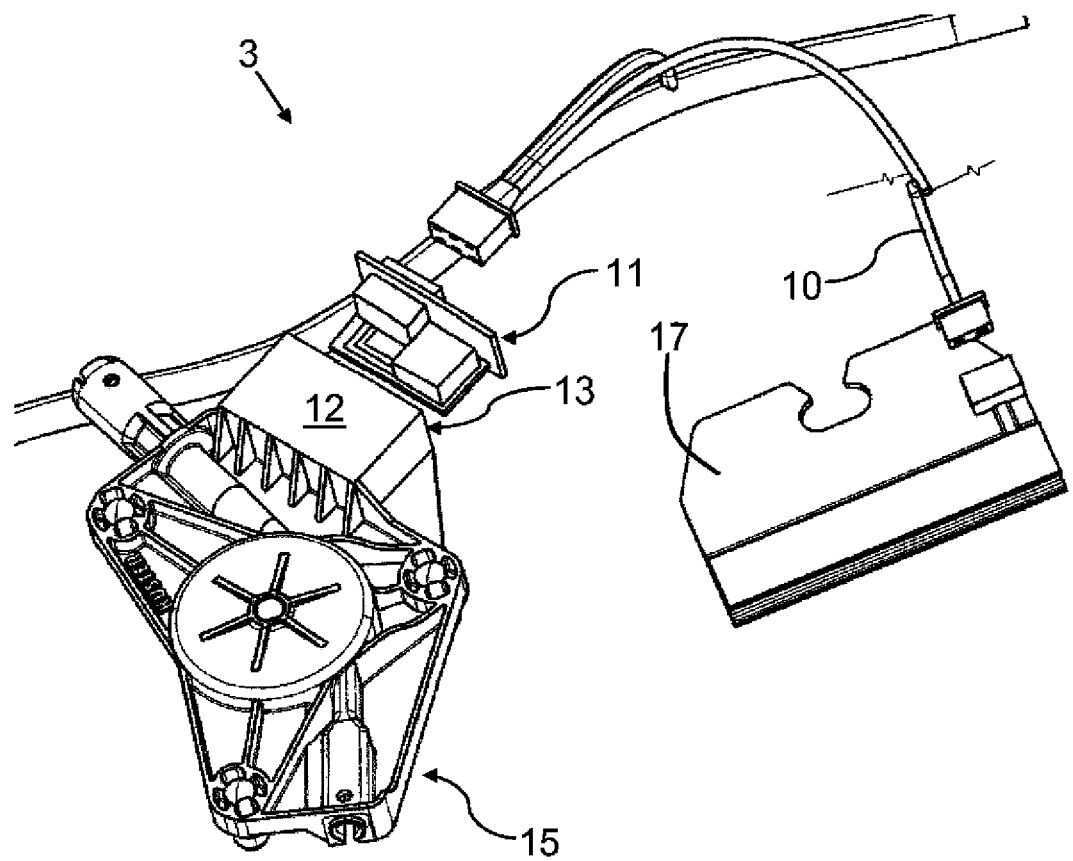

FIG. 4 shows a window regulator system 3 comprising a drive housing or cable drum housing 15 and, shaped onto it in one piece, a housing 12 that is configured to accommodate the control or regulation unit 11. The control or regulation unit 11 is inserted into the housing 12 through the housing opening 13. An electric connection between the control or regulation unit 11 and the window pane holder 17 is established via the line 10. Plugs are arranged at the ends of the line 10 in order to establish a simple and reversible connection between the control or regulation unit 11 and the window pane holder 17, and these plugs are connected to the control or regulation unit 11 and to the window pane holder 17 by means of a mating socket.

Figure 5:
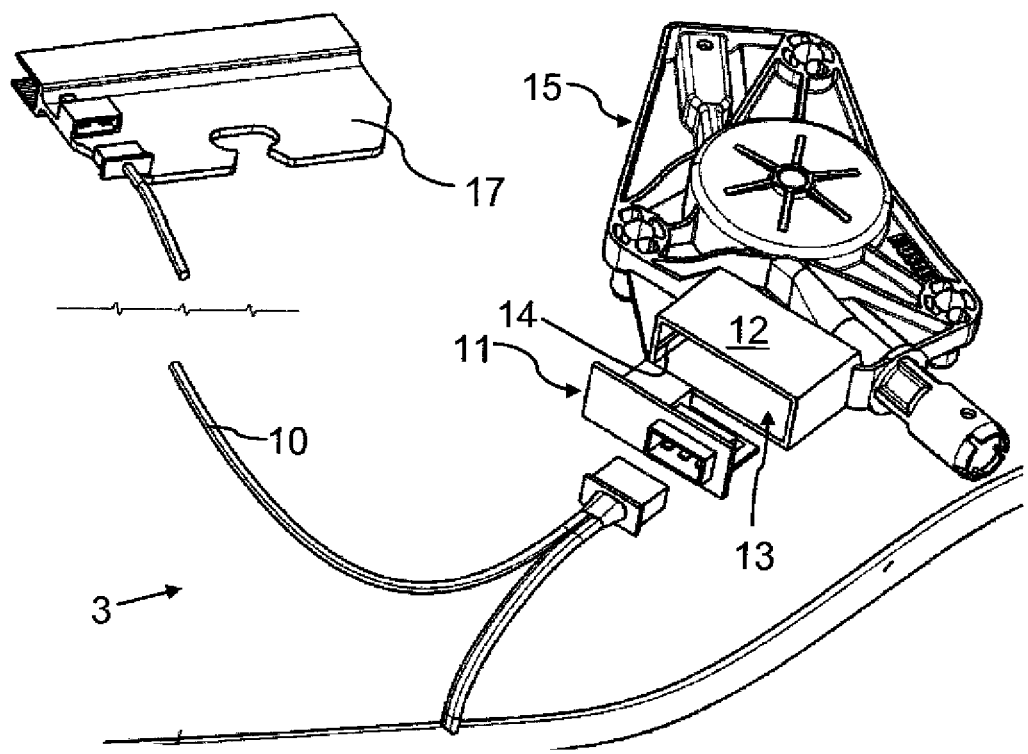

FIG. 5 shows the window regulator system according to FIG. 4 from a different perspective. The housing 12 is shaped in one piece onto the drive housing or cable drum housing 15 in order to accommodate the control or regulation unit 11. Guides 14 are shaped onto the side walls inside the housing 12 in order to allow easy insertion of the control or regulation unit 11. Here, the control or regulation unit 11 is inserted via the guides 14 into the housing 12 through the housing opening 13. The electric connection to the window pane holder 17 is established via the line 10.

Figure 6:
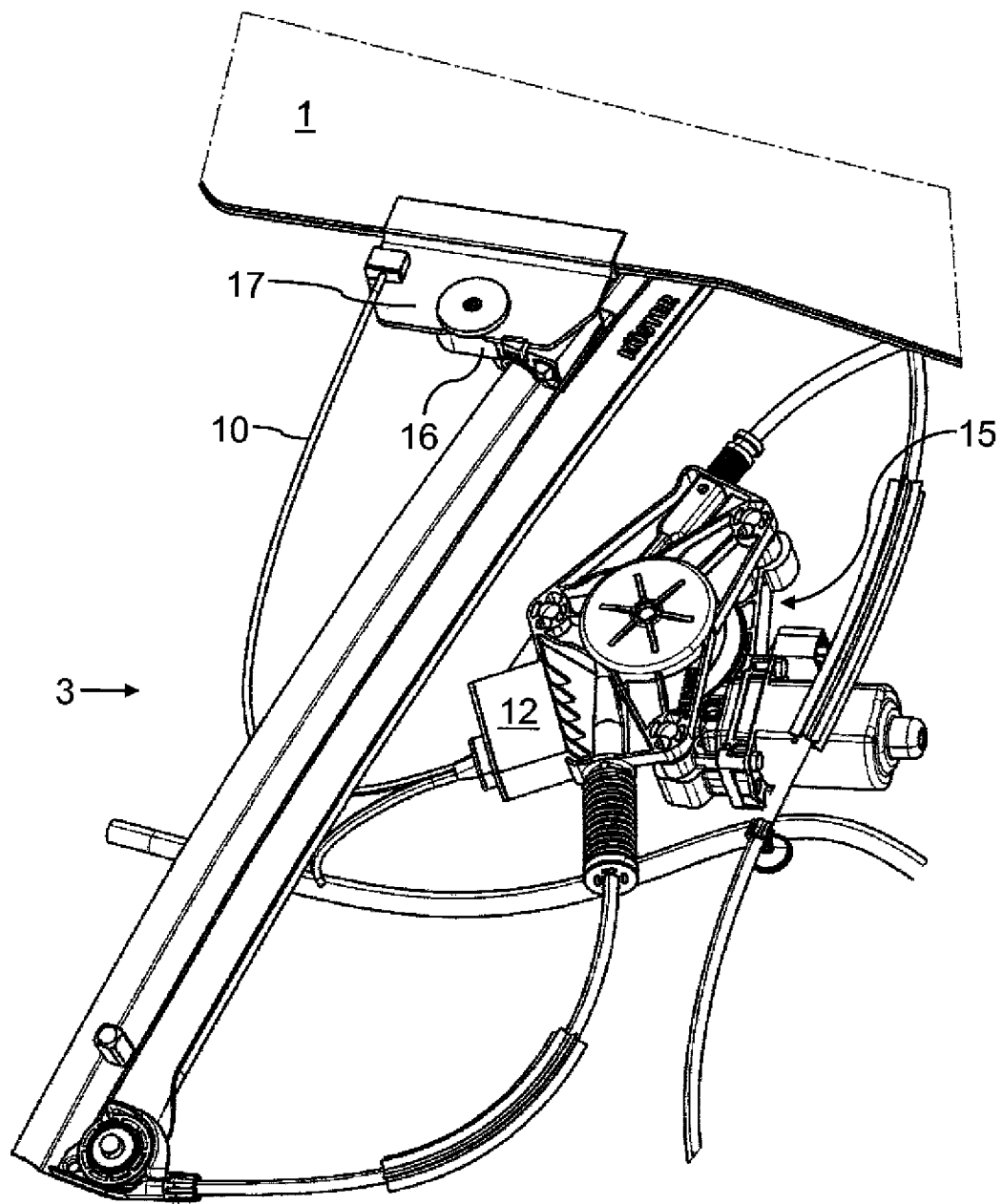

FIG. 6 shows a complete window regulator system with a window pane holder 17 in which the vehicle glazing 1 is inserted. The window pane holder 17 is arranged on a catch 16 that, in turn, is arranged movably on a guide rail. Via the line 10, the electric connection is established from the window pane holder 17 to the electric control or regulation unit 11 (not shown here) which is located in the housing 12. The housing 12 is shaped in one piece onto the drive housing or cable drum housing 15 of the window regulator 3.

Additional objectives, advantages, features and application possibilities of the present invention ensue from the description of embodiments herein with reference to the drawings. In this context, all of the described and/or depicted features, either on their own or in any meaningful combination, constitute the subject matter of the present invention, also irrespective of their compilation in the claims or in the claims to which they refer back.

LIST OF REFERENCE NUMERALS 1 vehicle glazing
2 car body
3 vehicle window regulator
10 line
11 control or regulation unit
12 housing
13 housing opening
14 guides
15 drive housing or cable drum housing
16 catch
17 window pane holder
18 plug or socket housing
20 fastening tab
21 fastening tab
22 fastening tab
23 U-shaped cutout
24 through hole
25 holder
26 leg
27 fastening extension
28 receptacle

The invention claimed is:

1. An electrically switchable motor vehicle glazing for a window of a motor vehicle adapted to change at least one optical property of the vehicle glazing for the window in response to an electrical signal, said motor vehicle having a body, comprising:

a one-piece housing connected to a drive housing or cable drum housing of a vehicle window regulator of the motor vehicle, without fastening devices to join said one-piece housing to said drive housing or cable drum housing, wherein said one-piece housing and drive housing or cable drum housing together remain substantially stationary relative to the body;

a control or regulation unit removably insertable into and held in the one-piece housing and thereby segregated from other components of the vehicle window regulator, said control or regulation unit being configured for feeding the electrical signal for opening and closing the vehicle glazing; and a line adapted to transmit the electrical signal from the control or regulation unit to a window pane holder of the vehicle glazing, wherein a distal end of the line includes a plug that directly inserts into the control or regulation unit.

2. The electrically switchable motor vehicle glazing according to claim 1, wherein the one-piece housing defines an interior, and the interior has at least one guide therein adapted for inserting and holding the control or regulation unit.

3. The electrically switchable motor vehicle glazing according to claim 2, wherein the one-piece housing has an opening communicating to the housing interior that is sealed in order to protect the control or regulation unit that is arranged in the one-piece housing, or the control or regulation unit that is cast into the one-piece housing.

4. The electrically switchable motor vehicle glazing according to claim 1, wherein the vehicle glazing is adapted to be heated in response to an electrical signal fed via the line that is arranged on the window pane holder of the vehicle glazing.

\* \* \* \* \*